United States Patent [19]

Higashitsutsumi et al.

[11] Patent Number: 5,040,070

[45] Date of Patent: Aug. 13, 1991

[54] SOLID-STATE IMAGE SENSING APPARATUS FOR ELECTRONICALLY CONTROLLING EXPOSURE BY EMPLOYING CCD AS SOLID-STATE IMAGE SENSING DEVICE AND METHOD OF DRIVING SUCH CCD

[75] Inventors: Yoshihito Higashitsutsumi, Gifu; Yukihiro Yamada, Daitou, both of Japan

[73] Assignee: Sanyo Electric Co., Ltd., Moriguchi, Japan

[21] Appl. No.: 598,312

[22] Filed: Oct. 16, 1990

[30] Foreign Application Priority Data

Oct. 17, 1989 [JP] Japan .................................. 1-269299
Oct. 17, 1989 [JP] Japan .................................. 1-269300

[51] Int. Cl.⁵ ..................... H04N 5/335; H04N 3/14; H04N 5/238
[52] U.S. Cl. ................................. 358/213.13; 358/228; 358/213.11; 358/213.19; 358/909; 358/213.25; 358/168; 354/402
[58] Field of Search .................. 358/213.11, 213.13, 358/213.19, 213.25, 228, 162, 168, 909; 354/402

[56] References Cited

U.S. PATENT DOCUMENTS

| | | | |
|---|---|---|---|
| 4,504,866 | 3/1986 | Saito | 358/213.13 |
| 4,695,888 | 9/1987 | Peterson | 358/213.13 |
| 4,734,777 | 3/1988 | Okino et al. | 358/228 |
| 4,760,452 | 7/1988 | Kaneko et al. | 358/213.13 |
| 4,763,196 | 8/1988 | Sakai | 358/213.13 |
| 4,779,137 | 10/1988 | Tojo et al. | 358/213.11 |
| 4,819,074 | 4/1989 | Suzuki | 358/213.13 |
| 4,839,734 | 6/1989 | Takemura | 358/213.26 |
| 4,843,476 | 6/1989 | Fujioka et al. | 358/228 |
| 4,910,606 | 3/1990 | Kinoshita et al. | 358/213.26 |
| 4,956,715 | 9/1990 | Okino et al. | 358/228 |

Primary Examiner—Howard W. Britton
Assistant Examiner—Glenton B. Burgess
Attorney, Agent, or Firm—Armstrong, Nikaido, Marmelstein, Kubovcik & Murray

[57] ABSTRACT

In solid-state image sensing apparatus including a frame transfer type CCD 10 as a solid-state image sensing device, charges stored in a light receiving portion 11 are once discharged externally in each vertical scanning period. Thereafter, newly stored charges are read as signal charges in a storage portion 12 in a vertical blanking period. Timing to discharge the charges is then set in accordance with an exposure state of the CCD, so that an exposure period is shortened and expanded. The width of a single shortening and expansion of the exposure period is variable. Particularly, when the charge discharging timing enters in the vertical blanking period, and the exposure period becomes significantly short, the charge discharging timing is set in a unit of a shorter period than one horizontal period of an image signal. This enables a uniform ratio of variation of the exposure period and prevention of unnatural changes of luminance on a reproduced picture.

8 Claims, 8 Drawing Sheets

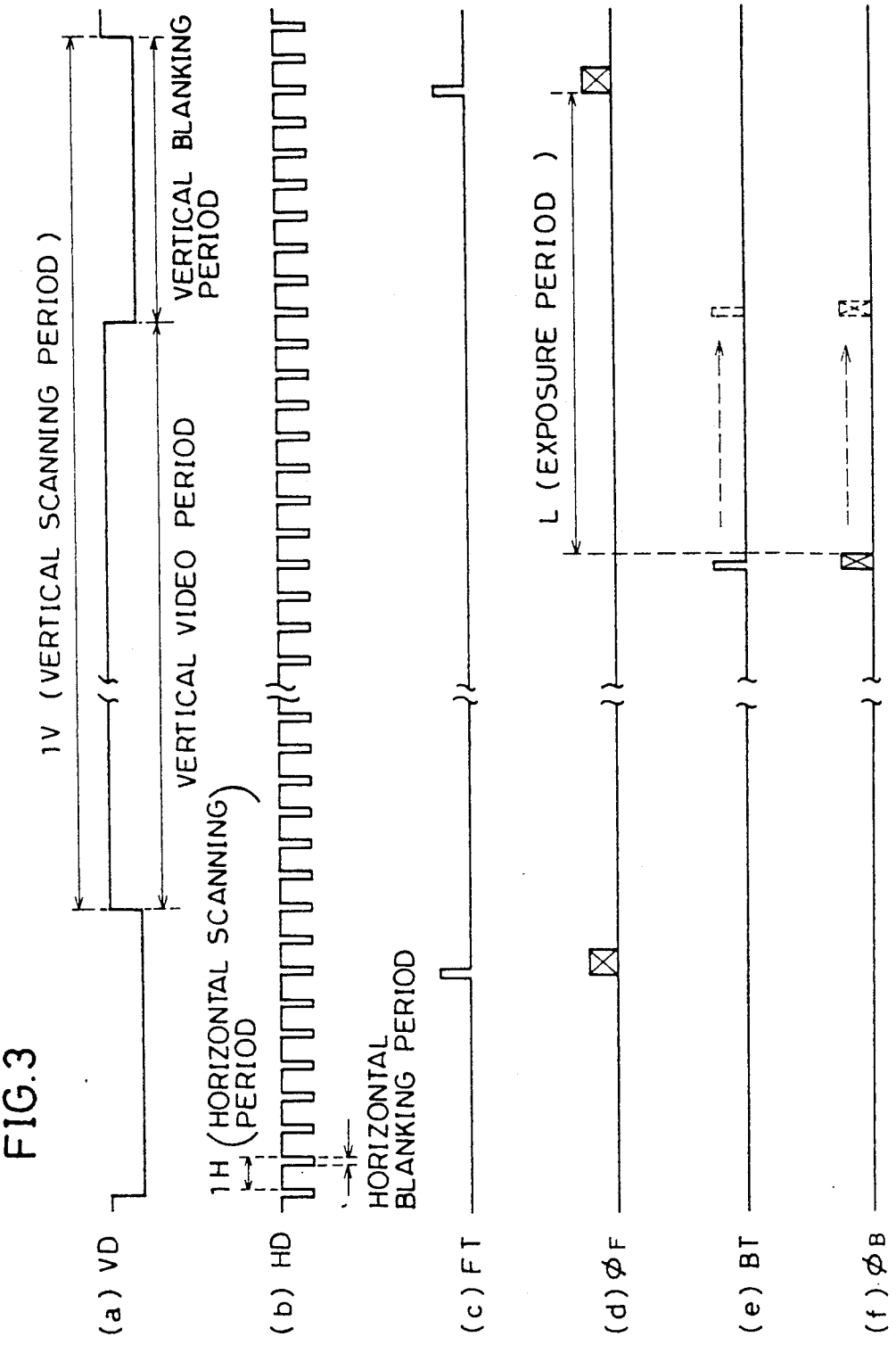

SOLID-STATE IMAGE SENSING APPARATUS FOR ELECTRONICALLY CONTROLLING EXPOSURE BY EMPLOYING CCD AS SOLID-STATE IMAGE SENSING DEVICE AND METHOD OF DRIVING SUCH CCD

BACKGROUND OF THE INVENTION

1. Field of the Invention

The present invention relates generally to solid-state image sensing apparatus employing a CCD (Charge-Coupled Device) as a solid-state image sensing device and methods of driving the CCD and, more particularly, to a solid-state image sensing apparatus such as video camera, which electronically controls exposure by shortening and expanding a photoelectric conversion period of a CCD and to a method of driving the CCD.

2. Description of the Background Art

In image sensing apparatus such as a video camera, a CCD has conventionally been in wide use as a solid-state image sensing device. The CCDs of frame transfer type and interline transfer type are widely known. A general description will now be given on a fundamental structure of the frame transfer type CCD and on a principle of operation of the CCD.

FIG. 1 is a schematic block diagram showing a general structure of the frame transfer type CCD. A CCD 10 shown in FIG. 1 includes a light receiving portion (an image sensing portion) 11, a storage portion 12 and a horizontal transfer portion 13.

Light receiving portion 11 includes a large number of light receiving elements (photosensors) Ph arranged two-dimensionally in the directions of rows and columns. These light receiving elements are vertically connected in series for each column. Light from an object is incident on light receiving portion 11 through a lens not shown.

Storage portion 12 also includes the same number of registers arranged two-dimensionally as the light receiving elements in light receiving portion 11. These registers are vertically connected in series for each column in the manner of expanding each column of the photosensors of light receiving portion 11, to constitute a shift register. Storage portion 12 is hindered from being exposed to light unlike light receiving portion 11.

Light incident on light receiving portion 11 is photoelectrically converted into signal charges (photo charges) by light receiving elements Ph. The generated charges are stored in each light receiving element Ph for each vertical scanning period. The signal charges thus stored and corresponding to one field are transferred to storage portion 12 by multi-phase clock pulses $\phi_F$ (e.g., $\phi_{F1}-\phi_{F3}$ in FIG. 1) which are applied to the light receiving elements from a signal source not shown, during a vertical blanking period of a video signal. Then, storage of the signal charges restarts from O in light receiving portion 11. The transfer of the signal charges from light receiving portion 11 to storage portion 12 requires two to three horizontal (H) periods in general and completes within the vertical blanking period.

The signal charges corresponding to one field thus transferred to storage portion 12 are sequentially read in horizontal transfer portion 13 in the next vertical video period. More specifically, the signal charges stored in storage portion 12 and corresponding to one horizontal scanning line are transferred to horizontal transfer portion 13 for each one horizontal period by multi-phase clock pulses $\phi_S$ (e.g., $\phi_{S1}-\phi_{S3}$ of FIG. 1) which are applied to the registers from a signal source not shown for each horizontal blanking period.

The signal charges corresponding to one horizontal scanning line and transferred to horizontal transfer portion 13 are horizontally transferred for each horizontal period by multi-phase clock pulses $\phi_H$ (e.g., $\phi_{H1}-\phi_{H3}$ of FIG. 1) which are applied to horizontal transfer portion 13 from a signal source not shown, and then supplied in sequence as an image signal X (t).

In solid-state image sensing apparatus employing the above-described CCD, exposure control apparatus for automatically controlling exposure by utilizing the above mentioned CCD operation principle is proposed and disclosed in, for example, Japanese Patent Laying-Open No. 63-24764. The principle of such automatic exposure control will now be described taking the frame transfer type CCD shown in FIG. 1 as an example.

That is, in the frame transfer type CCD of FIG. 1, the signal charges stored in light receiving portion 11 are transferred in the opposite direction to the direction of transfer for reading (the direction shown by the arrow in FIG. 1) at certain timing during a period of photoelectric conversion by light receiving portion 11 for each vertical scanning period, and then discharged to an drain or the like not shown. The discharge of the charges is carried out by controlling the phases of multi-phase clock pulses $\phi_F$ to be applied to light receiving elements Ph of light receiving portion 11, so that the discharge of all the charges can be completed within 2-3H periods likewise the case of reading. Then, only the charges, which are newly generated and stored in light receiving portion 11 in the remaining photoelectric conversion period (hereinafter referred to as exposure period) from the timing of the discharge to the next vertical blanking period, are transferred to storage portion 12 in the vertical blanking period and then outputted through horizontal transfer portion 13 in the above-described manner. The amount of photo signal charges to be obtained (image signal level) can be appropriately controlled by making the timing to discharge the charges of light receiving portion 11 in the opposite direction variable depending on luminance of the object, i.e., by making the remaining photoelectric conversion period (exposure period) expansible depending on the luminance of the object. That is, the control over the timing to discharge the charges makes it possible to obtain a constantly optimal exposure state.

Since the discharge of the charges in the opposite direction is carried out once for each vertical scanning period as described above, a processing for altering the timing to discharge the charges is also carried out for each vertical scanning period. In the foregoing conventional exposure control apparatus, the width of change of timing by a single processing for timing alteration is fixed at a definite value (e.g., the time corresponding to 8H periods).

When the width of a single shortening and expansion of the exposure period is fixed in a constant time, however, the ratio of the varying width of exposure period to the entire exposure period becomes different between a longer exposure period and a shorter exposure period, resulting in the following problem.

More specifically, when the width of a single shortening and expansion of the exposure period is fixed in e.g.

8H periods, the variation ratio of the exposure period in a certain vertical scanning period is 10% when the exposure period is e.g. 80H, while the ratio is 50% when the exposure period is e.g. 16H. Accordingly, the ratio of change in amount of signal charges to be obtained from the CCD as a solid-state image sensing device, i.e., in level of image signal X (t) becomes uneven for each vertical scanning period.

It has been generally confirmed by experiments that when the variation ratio of the exposure period is over 20%, a change in luminance on a reproduced picture due to this variation can be recognized by human eyes. Therefore, such uneven change of exposure period, i.e., an uneven change in level of an image signal for each vertical scanning period causes an uneven change in luminance on the reproduce picture, resulting in the reproduced picture which is extremely hard to see.

SUMMARY OF THE INVENTION

One object of the present invention is therefore to provide solid-state image sensing apparatus in which unnatural changes in luminance on a reproduced picture in accordance with variations of an exposure period are prevented.

Another object of the present invention is to provide solid-state image sensing apparatus in which a uniform ratio of variation of an exposure period can be achieved even when the exposure period becomes significantly short.

A further object of the present invention is to provide solid-state image sensing apparatus in which the timing to discharge charges from a CCD can be set in a unit of period shorter than one horizontal period.

Briefly, the present invention is solid-state image sensing apparatus for generating an image signal corresponding to an image pattern of an object and includes a solid-state image sensing device, a circuit for driving the solid-state image sensing device, an exposure determining circuit and a timing control circuit. The solid-state image sensing device is constituted by a plurality of light receiving elements arranged two-dimensionally in the directions of rows and columns and serves to convert light incident from the object into signal charges. The solid-state image sensing device driving circuit serves to drive the solid-state image sensing device so as to once discharge signal charges which are generated and stored in the solid-state image sensing device out of the solid-state image sensing device at variable timing during each vertical scanning period of the image signal and thereafter to read signal charges which are generated and stored in the solid-state image sensing device in the remaining period of the vertical scanning period at predetermined timing in a vertical blanking period of the vertical scanning period. The exposure determining circuit determines whether or not an exposure state of the solid-state image sensing device is in the range of appropriate exposure, in accordance with the amount of the signal charges read from the solid-state image sensing device. The timing control circuit controls the driving circuit so as to set the timing to discharge the signal charges in response to the result of determination by the exposure determining circuit. The timing control circuit includes a data holding circuit for holding data $S_x$ designating the timing to discharge the signal charges for each vertical scanning period, an operation circuit for calculating data $S_x \pm S_x/n$ (n is an integer) based on data $S_x$ in response to the result of determination by the exposure determining circuit, a counter circuit for performing a counting operation in response to clock pulses based on a horizontal synchronizing signal of an image signal, to generate count data $T_x$ which varies with an elapse of time, and a comparison circuit for comparing data $S_x \pm S_x/n$ to be supplied from the operation circuit with count data $T_x$ to be supplied from the counter circuit, to set the timing to discharge the signal charges to the timing at which both data matches.

According to another aspect of the present invention, the timing control circuit is controlled so that when the charge discharging timing is within a vertical blanking period, the setting of the charge discharging timing is carried out in a unit of a period shorter than one horizontal scanning period of an image signal.

According to a further aspect of the present invention, the counter circuit performs counting operation in a period shorter than a horizontal scanning period during the vertical blanking period and otherwise in a period equal to a horizontal scanning period.

According to a still further aspect of the present invention, the timing control circuit further includes a circuit for shifting data in each of the data holding circuit, the operation circuit, the counter circuit and the comparison circuit to the higher order or the lower order by m digits, and also multiplying the period of clock pulses to be applied to the counter circuit by $\frac{1}{2}^m$ or by $2^m$ when a detection is made that the signal charge discharging timing enters in the vertical blanking period based on data $S_x \pm S_x/n$.

A principal advantage of the present invention is that the ratio of variation in exposure period for each vertical scanning period can be made uniform by making the width of shortening and expansion of the exposure period be a variable period corresponding to 1/n of the previous exposure period.

Another advantage of the present invention is that when the signal charge discharging timing enters in the vertical blanking period, so that the exposure period becomes significantly shorter, the setting of the charge discharging timing in a unit of a period shorter than one horizontal period makes it possible to achieve the uniform ratio of variation of the exposure period and also to prevent unnatural changes of luminance on a reproduced picture.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a timing chart for explaining operation of the solid-state image sensing apparatus shown in FIG. 2;

DESCRIPTION OF THE PREFERRED EMBODIMENTS

Figure 2:
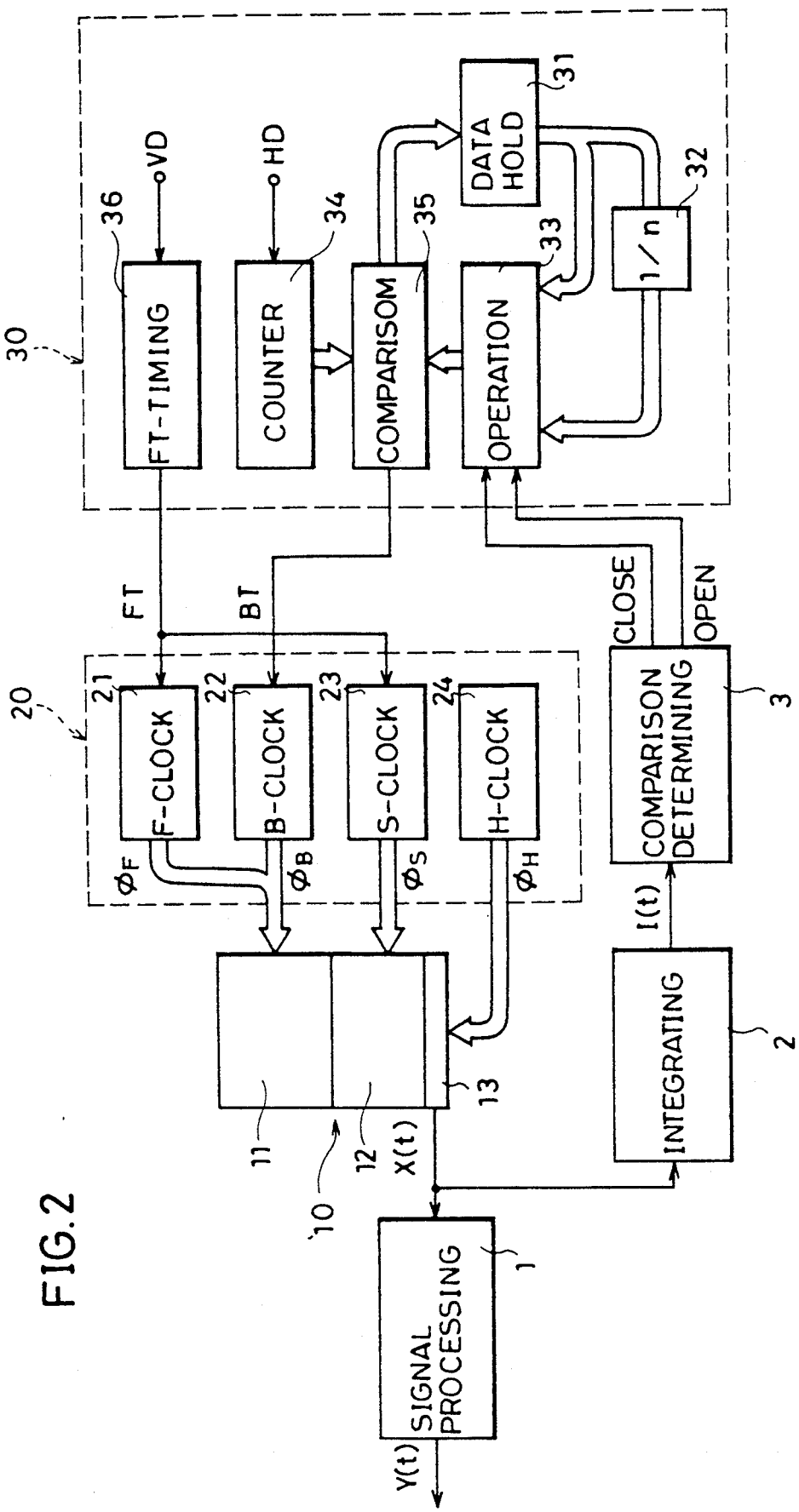
FIG. 2 is a schematic block diagram showing solid-state image sensing apparatus according to a first embodiment of the present invention.

FIG. 2 is a schematic block diagram showing solid-state image sensing apparatus according to the first embodiment of the present invention, and FIG. 3 is a timing chart for explaining operation of the apparatus.

Figure 1:
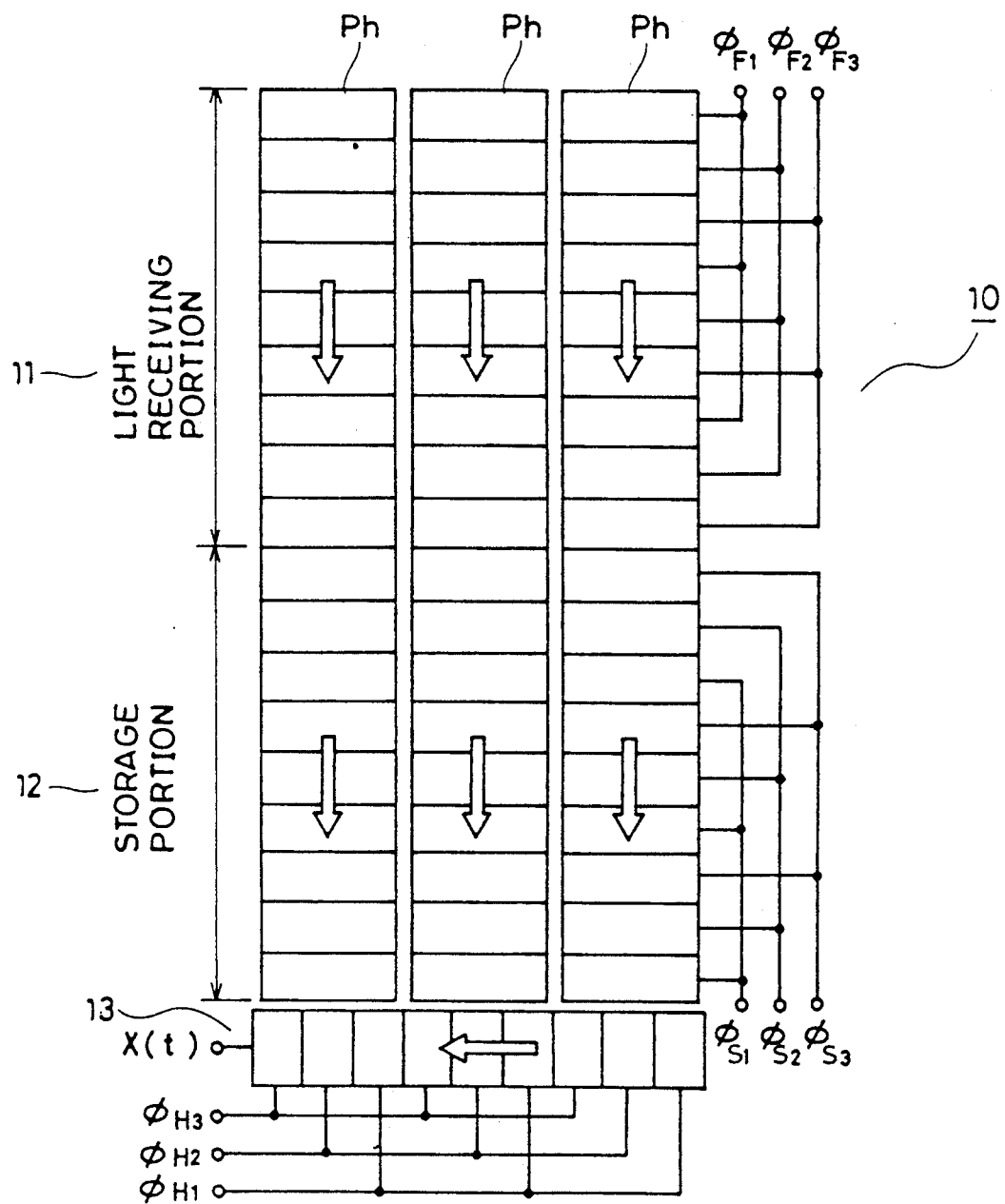
FIG. 1 is a schematic block diagram showing a general structure of a frame transfer type CCD.

In FIG. 2, a CCD 10 including a light receiving portion (image sensing portion) 11, a storage portion 12 and a horizontal transfer portion 13 is identical to the one shown in FIG. 1, and hence a detailed description thereof will not be repeated. An image signal X (t) outputted from horizontal transfer portion 13 is subjected to processings such as sample holding, gamma correction, etc. in a signal processing circuit 1 of FIG. 2 and then supplied externally as a video signal Y (t).

A driving circuit 20 serves to generate pulses for driving CCD 10 in the manner explained with respect to FIG. 1. In more detail, driving circuit 20 includes a read clock pulse generating circuit 21 for generating multi-phase read clock pulses $\phi_F$ (FIG. 3 (d)) for transferring signal charges stored in light receiving portion 11 to storage portion 12 for each vertical scanning period, a discharge clock pulse generating circuit 22 for generating multi-phase discharge clock pulses $\phi_B$ (FIG. 3 (f)) for discharging the signal charges stored in light receiving portion 11 in the opposite direction from the direction of reading during a vertical scanning period, a transfer clock pulse generating circuit 23 for generating multi-phase transfer clock pulses $\phi_S$ for transferring the signal charges stored in storage portion 12 to horizontal transfer portion 13 for each horizontal period, and an output clock pulse generating circuit 24 for outputting multi-phase output clock pulses $\phi_H$ for outputting the signal charges transferred to horizontal transfer portion 13 as image signal X (t) for each horizontal period. These clock pulse generating circuits 21, 22, 23 and 24 generate the above-described various clock signals based on basic clock pulses to be supplied from a common oscillation source not shown. The basic clock pulses are also employed for production of a vertical synchronizing signal VD (FIG. 3 (a)) and a horizontal synchronizing signal HD (FIG. 3 (b)).

The generated vertical synchronizing signal VD is applied to a read timing circuit 36 which is a part of a timing control circuit 30. In response to vertical synchronizing signal VD, a read timing circuit 36 generates a read timing signal FT (FIG. 3 (c)) including a read pulse at specific timing in a blanking period of vertical synchronizing signal VD, and supplies the same to read clock pulse generating circuit 21 and to transfer clock pulse generating circuit 23. Read clock pulse generating circuit 21 generates the above-described multi-phase read clock pulses $\phi_F$ (FIG. 3 (d)) in synchronization with read timing signal FT. Transfer clock pulse generating circuit 23 generates the above-described multi-phase transfer clock pulses $\phi_S$ in synchronization with read timing signal FT. Output clock pulse generating circuit 24 is controlled by an output of transfer clock pulse generating circuit 23 so that the transfer of charges from storage portion 12 to horizontal transfer portion 13 and the output of the charges from horizontal transfer portion 13 may be carried out at predetermined timing.

Discharge clock pulse generating circuit 22 is supplied with a discharge timing signal BT (FIG. 3 (e)) including a discharge pulse at timing corresponding to the amount of exposure of CCD 10 from a comparison circuit 35 in timing control circuit 30.

A description will now be given on the manner of determining the timing to discharge the charges. Image signal X (t) outputted from horizontal transfer portion 13 of CCD 10 is first applied to signal processing circuit 1 and to an integrating circuit 2 to be integrated for each vertical scanning period. A resultant integral value I (t) is supplied to a comparison determining circuit 3 for each vertical scanning period. Comparison determining circuit 3 compares the supplied integral value I (t) with an upper limit value Lmax and a lower limit value Lmin which are previously determined corresponding to an appropriate exposure range. As a result, when integral value I (t) is higher than upper limit value Lmax, comparison determining circuit 3 determines that CCD 10 is excessively exposed, to generate a signal CLOSE for delaying the timing to discharge the charges, i.e., shortening an exposure period and supply the signal to an operation circuit 33 in timing control circuit 30. Conversely, when integral value I (t) is lower than lower limit value Lmin, comparison determining circuit 3 determines that CCD 10 is insufficiently exposed, to generate a signal OPEN for advancing the timing to discharge the charges, i.e., expanding the exposure period and supply the same to operation circuit 33.

Timing control circuit 30 includes a data holding circuit 31, a dividing circuit 32 and a counter 34 other than the above-described read timing circuit 36, comparison circuit 35 and operation circuit 33. Data holding circuit 31 holds step data $S_x$ for designating the timing to discharge the charges in the opposite direction by the numbers of horizontal periods in the vertical scanning period (X is a positive integer for specifying the step of altering the timing). It is assumed, in this example, that the number of the last horizontal period in one vertical scanning period is 1, and the other horizontal periods are each denoted with the increasing numbers serially back to the beginning. Step data $S_x$ held in data holding circuit 31 is supplied as it is to operation circuit 33, while 1/n of the data is calculated by dividing circuit 32, and then resultant data $S_x/n$ is supplied to operation circuit 33.

When supplied with shortening signal CLOSE from the foregoing comparison determining circuit 3, operation circuit 33 subtracts division data $S_x/n$ from step data $S_x$ and then outputs the resultant $S_x - S_x/n$ as the next step data $S_{x+1}$. On the other hand, when supplied with expansion signal OPEN from comparison determining circuit 3, operation circuit 33 adds division data $S_x/n$ to step data $S_x$ and outputs the resultant $S_x + S_x/n$ as the next step data $S_{x+1}$. The output of operation circuit 33, $S_{x+1} = S_x \pm S_x/n$ is supplied to one input of comparison circuit 35 and also to data holding circuit 31 to be stored therein again.

When neither shortening signal CLOSE nor expansion signal OPEN are output from comparison determining circuit 3, operation circuit 33 performs neither the foregoing subtracting operation nor adding operation and outputs step data $S_x$ as it is as the next step data $S_{x+1}$.

Step counter 34 is a down-counter which is counted down by a horizontal synchronizing signal HD. A count value of the down-counter defines the timing of each horizontal period in the vertical scanning period with the same numbering as that of the above-described step data. A count output of step counter 34 is supplied to the other input of comparison circuit 35.

Comparison circuit 35 makes a comparison between data $S_{x+1} = S_x \pm S_x/n$ outputted from operation circuit 33 and the count output of step counter 34, and when the data and the count output match each other, it generates the above-described discharge pulse BT (FIG. 3 (e)) to supply the same to discharge clock pulse generating circuit 22. In response to the discharge pulse BT, discharge clock pulse generating circuit 22 generates multi-phase discharge clock pulses $\phi_B$ to discharge the charges from light receiving portion 11.

Now, the timing to read signal charges from light receiving portion 11 is fixed to the predetermined timing (FIG. 3 (c)) in a vertical blanking period of a vertical synchronizing signal VD. Therefore, a photoelectric conversion period (L of FIG. 3) as an exposure period is determined for each step in accordance with the timing to discharge the charges, which is defined by step data $S_x$ in each step. The width of shortening and expansion of the exposure period in each step is not a fixed period but always a variable period corresponding to 1/n of the previous exposure period, as apparent from an expression $S_{x+1} = S_x \pm S_x/n$, representing the step data. In other words, the time width to be shortened and expanded becomes smaller in the step (vertical scanning period) of a shorter exposure period, while it becomes larger in the step of a longer exposure period. Consequently, in the apparatus according to the embodiment of FIG. 2, the ratio of variation in the exposure period for each vertical scanning period becomes uniform, thereby preventing such uneven changes in luminance on a reproduced picture as produced in the conventional solid-state image sensing apparatus.

Even in the solid-state image sensing apparatus as shown in FIG. 2, however, when the exposure period is extremely short, such a case is considered that the width of shortening and expansion of the exposure period becomes definite throughout several steps, and hence the variation ratio of the exposure period cannot be kept constant.

That is, assuming that a value n of dividing circuit 32 of FIG. 2 is 8, for example, when the step in which the exposure period is 80H-87H continues several times, the varying width of the exposure period in each step is always 10H, and the varying ratio of the exposure period is 12.5%-11.5%. On the other hand, when the step in which the exposure period is 16H-23H continues, the varying width of the exposure period in each step is always 2H, and the varying ratio is 12.5%-8.7%. Particularly, when the step in which the exposure period is shorter than or equal to 15H continues, the varying width of the exposure period in each step is always 1H, and the varying ratio is extremely uneven as 50%-6.5%. In order to prevent noises produced in CCD 10 from being superimposed on image signal X (t) upon discharge of the charges in the opposite direction, the timing to discharge the charges is set in each horizontal blanking period, during the vertical video period. Accordingly, the setting of the charge discharging timing cannot be carried out in a unit of a period shorter than 1H. As a result, such a circumstance is considered that when the exposure period is very short, uneven changes in luminance occur on a reproduced picture, resulting in the reproduced picture which is considerably objectionable to the viewers.

Figure 4:
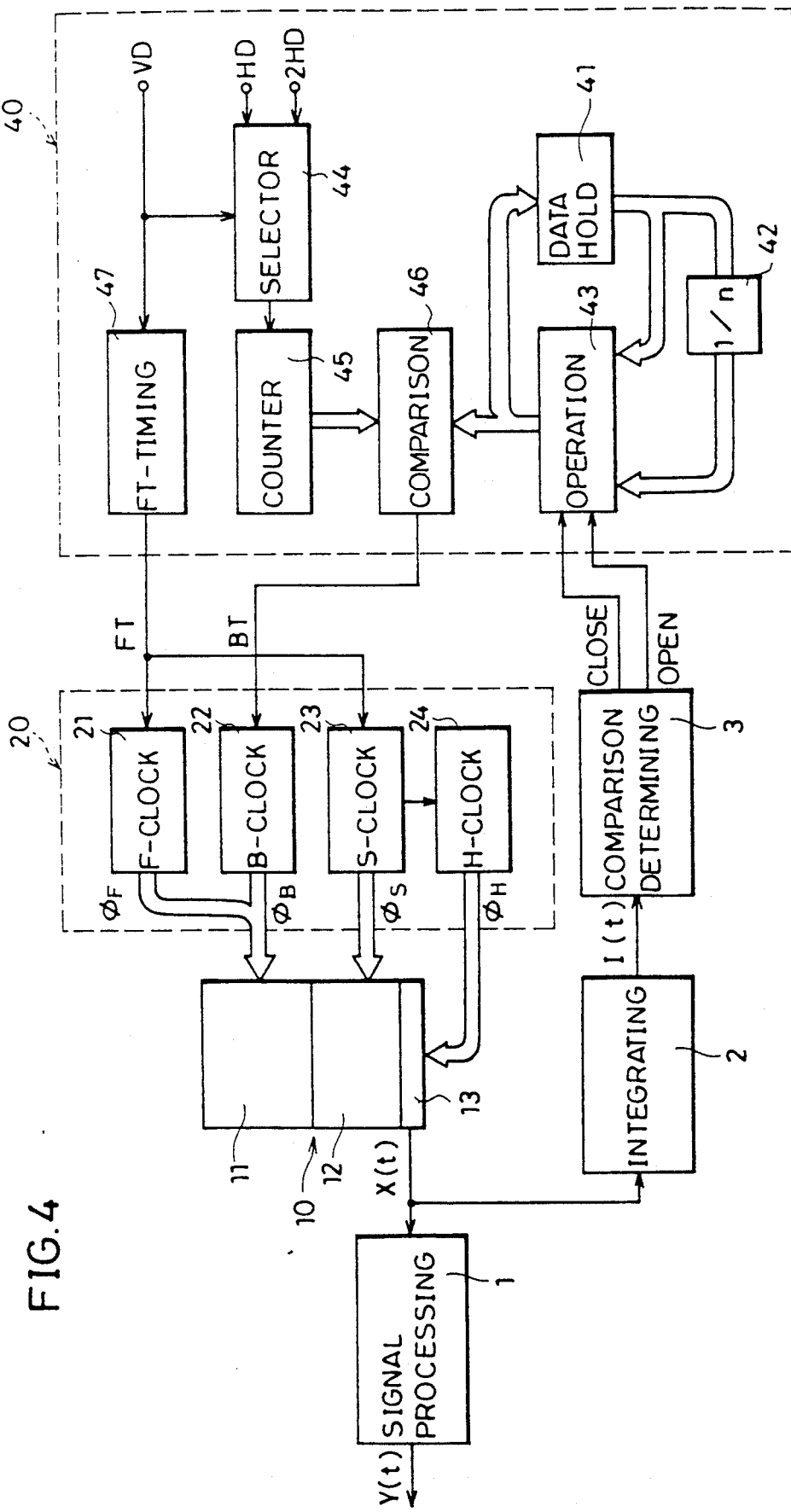
FIG. 4 is a schematic block diagram showing solid-state image sensing apparatus according to a second embodiment of the present invention.
Figure 5:
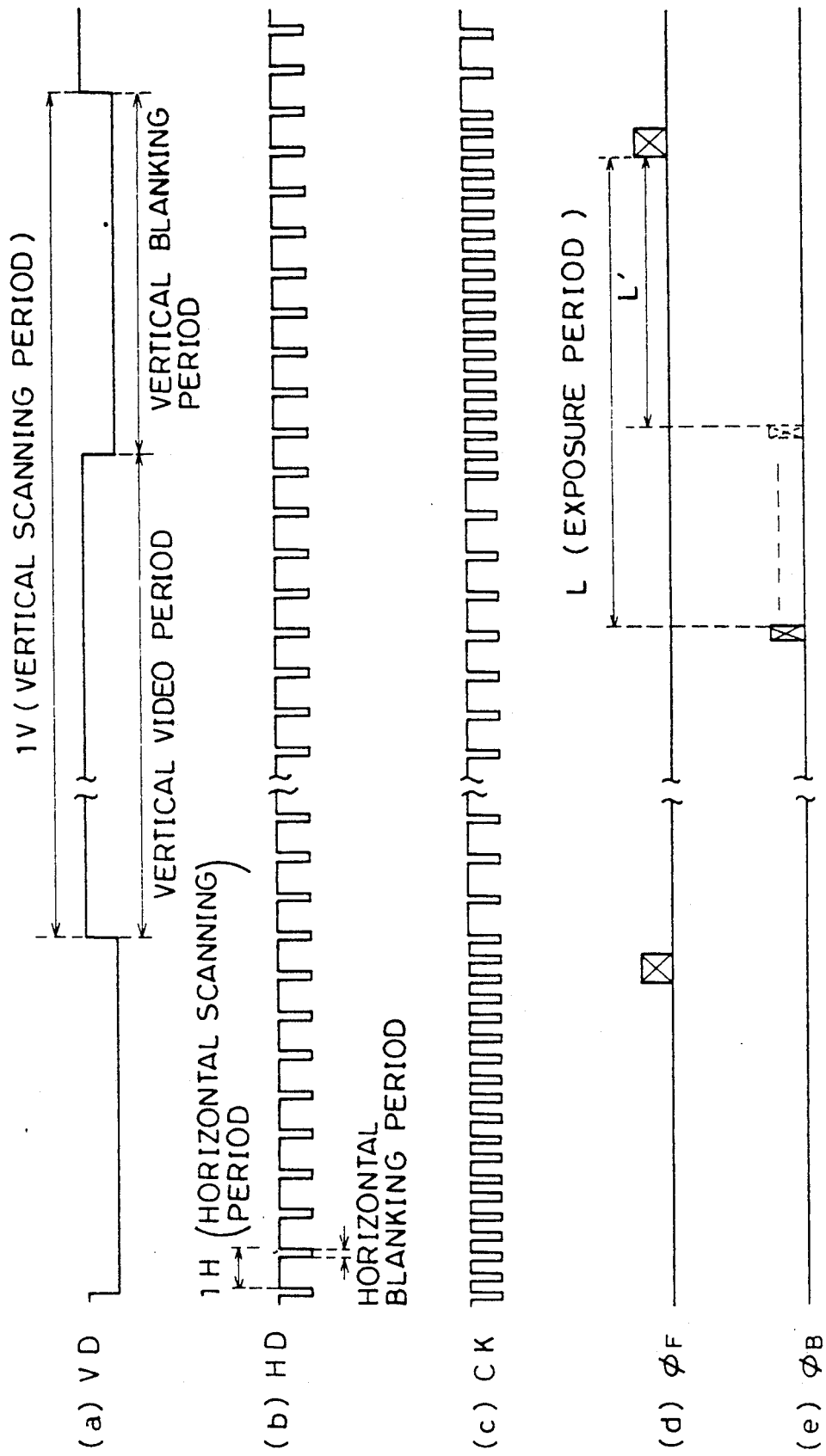
FIG. 5 is a timing chart for explaining operation of the solid-state image sensing apparatus shown in FIG. 4.

FIG. 4 is a schematic block diagram showing solid-state image sensing apparatus according to the second embodiment of the present invention, which is proposed to solve the foregoing problem, and FIG. 5 is a timing chart for explaining operation of the apparatus. The embodiment shown in FIG. 4 is identical to the apparatus shown in FIG. 2 except for provision of a timing control circuit 40 in place of timing control circuit 30 of FIG. 2. Therefore, a description as to portions other than timing control circuit 40 in FIG. 4 will not be repeated here.

A principle of the second embodiment of the present invention will first be described with reference to FIGS. 4 and 5. In the solid-state image sensing apparatus according to the first embodiment shown in FIG. 2, as mentioned above, the timing to discharge the charges is defined during each horizontal blanking period in order to prevent noises produced in CCD 10 upon the discharge of the charges in the opposite direction from being superimposed on image signal X (t) during the vertical video period. (see FIG. 3 (b) and (c)).

However, when an exposure period L (FIG. 5) becomes considerably shorter, so that the charge discharging timing is absorbed in a vertical blanking period as shown by L' of FIG. 5, no noises caused by the discharge of the charges are superimposed on image signal X (t) since no image signal X (t) inherently exists in the vertical blanking period. This enables the charge discharging timing to be set to arbitrary timing in the vertical blanking period without being subject to the above-described limitations.

Thus, in the second embodiment of the present invention, timing control circuit 40 is configured such that the timing to discharge the charges from CCD 10 in the opposite direction may be set, in a unit of a period shorter than one horizontal period, in the vertical blanking period of the image signal. This makes it possible to reduce the varying width of the exposure period in each step to 1H or less and to make the varying ratio thereof more uniform when the exposure period becomes significantly shorter (e.g., 15H or less).

The second embodiment shown in FIG. 4 will now be described in detail. Referring to FIG. 4, timing control circuit 40 comprises a data holding circuit 41 for holding step data $S_x$ designating the timing to discharge the charges in the opposite direction, a dividing circuit 42 for calculating 1/n of the step data read from data holding circuit 41, an operation circuit 43 for calculating the sum of or the difference between step data $S_x$ and division data $S_x/n$, a selector 44 responsive to a horizontal synchronizing signal HD (FIG. 5 (b)) and to a signal 2HD having a ½ period of the signal HD for selecting either of the signals as clock pulses CK (FIG. 5 (c)), a step counter 45 serving as a down-counter which is counted down by the clock pulses CK selected by selector 44, a comparison circuit 46 for making a comparison between data output from operation circuit 43 and a count output of step counter 45, and when the data and the count output match each other, generating a discharge pulse BT to supply the same to discharge clock pulse generating circuit 22, and a read timing circuit 47 responsive to a vertical synchronizing signal VD (FIG. 5 (a)) for generating a read timing signal FT to supply the same to read clock pulse generating circuit 21 and to transfer clock pulse generating circuit 23. Discharge clock pulse generating circuit 22 generates discharge clock pulses $\phi_B$ (FIG. 5 (e)) in response to discharge pulse BT, while read clock pulse generating circuit 21 generates read clock pulses $\phi_F$ (FIG. 5 (d)) in response to read timing signal FT.

Data holding circuit 41, dividing circuit 42, operation circuit 43, step counter 45, comparison circuit 46 and read timing circuit 47 out of the above-described elements of timing control circuit 40 are substantially the same as data holding circuit 31, dividing circuit 32, operation circuit 33, step counter 34, comparison circuit 35 and read timing circuit 36 shown in FIG. 2, respectively. Therefore, a detailed description thereof will not be repeated.

Selector 44 in FIG. 4 selects signal HD during the vertical video period and the signal 2HD during the vertical blanking period in response to vertical synchronizing signal VD, to supply these signals as clock pulses CK (FIG. 5 (c)) to step counter 45. Accordingly, step counter 45 is counted down in a horizontal period during the vertical video period and in a ½ period of the horizontal period during the vertical blanking period.

As a result, a count output $T_x$ which varies in the different periods between the vertical video period and the vertical blanking period is output from step counter 45 and is then compared with step data $S_{x+1}=S_x\pm S_x/n$ in comparison circuit 46. When count output $T_x$ matches the step data, comparison circuit 46 generates discharge pulse BT to supply the same to discharge clock pulse generating circuit 22. In response to the supplied discharge pulse BT, discharge clock pulse generating circuit 22 generates multi-phase discharge clock pulses $\phi_B$ (FIG. 5(e)) to discharge the charges from light receiving portion 11 in the opposite direction.

When the charge discharging timing is included in the vertical video period, i.e., the exposure period is relatively long (the period denoted with L of FIG. 5), the charge discharging timing is set with 1 horizontal (H) period taken as a unit likewise the first embodiment shown in FIG. 2. Meanwhile, when the charge discharging timing is included in the vertical blanking period, i.e., the exposure period is significantly short (the period denoted with L' of FIG. 5), the charge discharging timing is set with a (½) H period taken as a unit. This makes it possible to reduce the varying width of the exposure period in each step to shorter than 1H and further to make the varying ratio of the exposure period uniform when the exposure period is considerably short. In this case, even if the charges are discharged at arbitrary timing, no noises due to the discharge of the charges are superimposed on the image signal during the vertical blanking period.

The operation of the second embodiment shown in FIG. 4 will now be described in more detail employing numeric values. In the following example, n of the dividing circuit is set to 8, and step data $S_x$ is constituted by 8 bits. Step counter 45 is down-counted in a (½) H period during the vertical blanking period, as already described above.

First, it is assumed that step data $S_x$ designating the timing to discharge the charges is "10110010 (=178)". Since a period for counting in the vertical blanking period is now ½ in the vertical video period, the actual exposure period L becomes 170H, which is the result of subtraction of extra 8 periods in the vertical blanking period from 178 periods. Dividing circuit 42 obtains "00010110 (=22)" by shifting by 3 bits the data $S_x$="10110010" to lower order in order to acquire $S_x/8$.

When an expansion signal OPEN is applied to operation circuit 43 from comparison determining circuit 3, data $S_{x+1}$ is "10110010"+"00010110"="11001000 (=200)" since $S_{x+1}=S_x+S_x/8$ in this case. That is, the exposure period is 200−8=192H in consideration of the extra periods in the vertical blanking period.

On the other hand, when a shortening signal CLOSE is applied to operation circuit 43 from comparison determining circuit 3, data $S_{x+1}$ is "10110010"−"00010110"="10011100 (=156)" since $S_{x+1}=S_x-S_x/8$ in this case. That is, the exposure period is 156−8 =148H.

Thus, when data $S_x$ is larger than "00010000 (=16)", the charge discharging timing is within the vertical video period, and hence the exposure period L is set in a unit of 1H in each step as described above.

When data $S_x$ is smaller than "00010000 (=16)", however, the charge discharging timing enters in the vertical blanking period, and hence an exposure period L' is set in a unit of (½) H in each step. For example, when data $S_{x+1}$="00001011 (=11)" is supplied to comparison circuit 46, counter 45 is down-counted in a (½) H period, and hence exposure period L' is set to 11/2=5.5H. Then, exposure period L' is expanded or shortened in the (½) H unit every time expansion signal OPEN or shortening signal CLOSE is generated.

While counter 45 is operated in the (½) H period during the vertical blanking period in the foregoing embodiment, operating counter 45 in a still shorter period enables a more fractionized setting of the charge discharging timing in the vertical blanking period.

In addition, if the vertical blanking period is divided into the first half and the latter half and counter 45 becomes operative at a still high speed in the latter half by providing clock pulses having a shorter period in the latter half than that in the first half to counter 45, the present invention can be more effective in such a case that the exposure period is further shorter.

Figure 6:
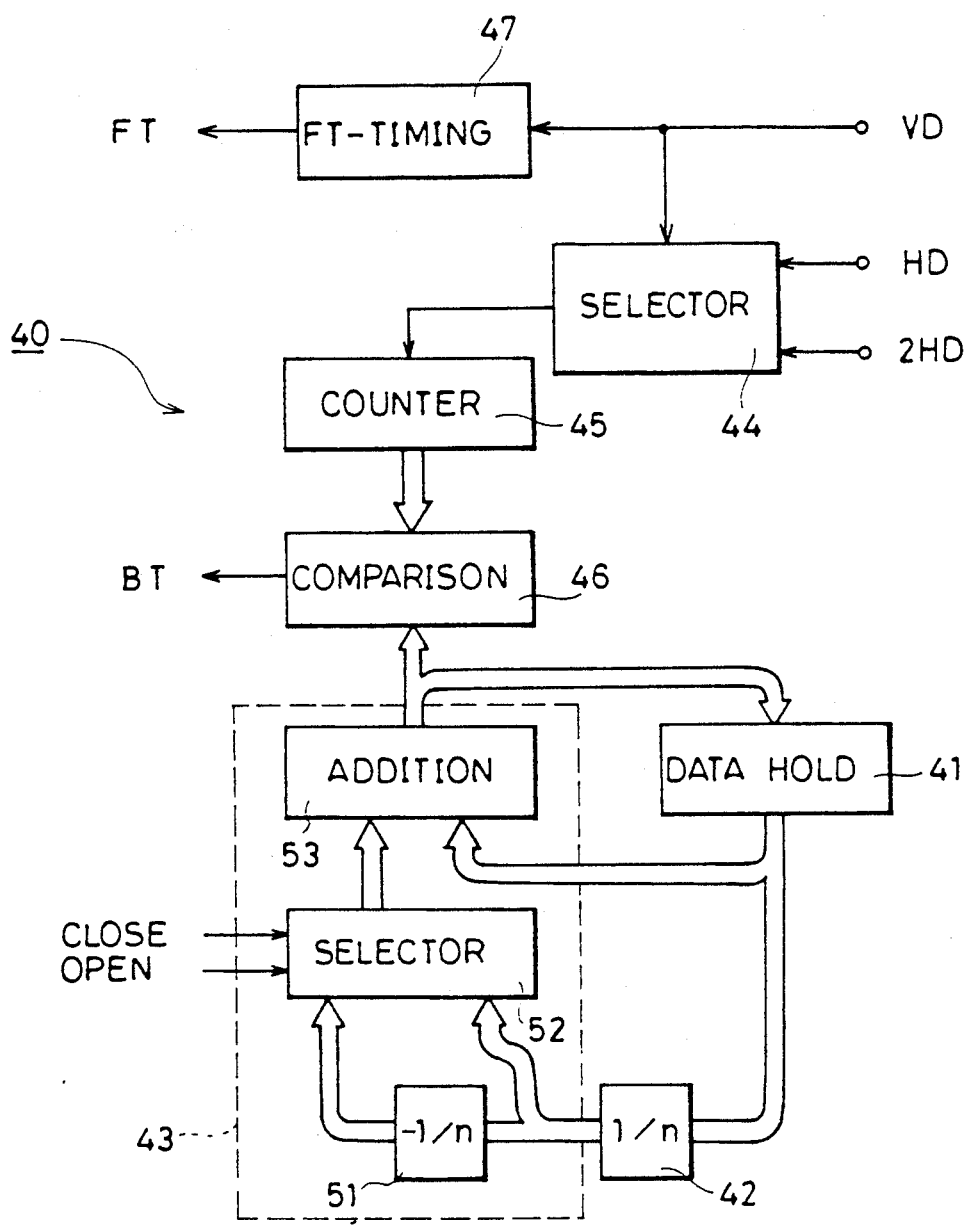
FIG. 6 is a block diagram showing the detail of an operation circuit shown in FIG. 4.

FIG. 6 is a block diagram showing the detail of operation circuit 43 shown in FIG. 4. Referring to FIG. 6, operation circuit 43 comprises a negative division circuit 51 for obtaining inverted data $-S_x/n$ of the output $S_x/n$ of dividing circuit 42, a selector 52 for selecting an output of dividing circuit 42 or that of negative division circuit 51 to output the selected output in response to expansion signal OPEN or shortening signal CLOSE from comparison determining circuit 3, and an adding circuit 53 for adding step data $S_x$ outputted from data holding circuit 41 and data $\pm S_x/n$ outputted from selector 52 to output data $S_{x+1}=S_x\pm S_x/n$.

Negative division circuit 51 inverts each bit of data $S_x/n$ output from dividing circuit 42 and adds "1" to the least significant bit, to obtain data $S_x/n$. Assuming that n is 8, for example, when data $S_x$ is "10110010", data $S_x/8$ is "00010110" when shifted by 3 bits to lower order as described above. Thus, $-S_x/8$ becomes "11101010". Accordingly, data $S_x+S_x/8$ is "10110010"+"00010110"="11001000", and data $S_x-S_x/8$ is "10110010"+"11101010"="10011100". These results match those obtained in the aforementioned explanation as to the operation of FIG. 4.

As has been described, according to the second embodiment of the present invention, even when the exposure period is considerably short, reducing the varying width of the exposure period in each step to smaller than 1H makes it possible to uniform the varying ratio of the exposure period and also to prevent unnatural changes in luminance on a reproduced picture.

Figure 7:
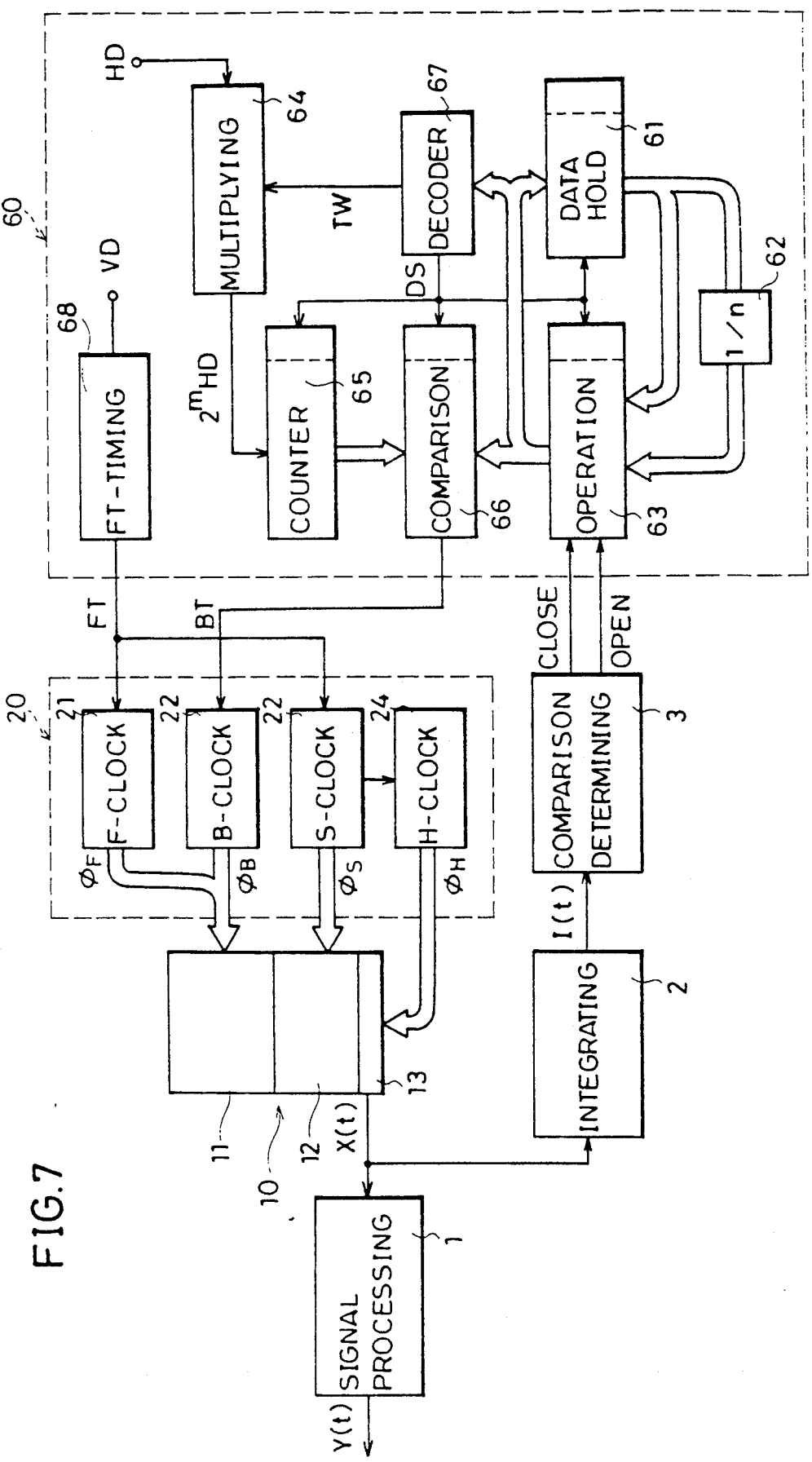
FIG. 7 is a schematic block diagram showing solid-state image sensing apparatus according to a third embodiment of the present invention.

FIG. 7 is a schematic block diagram showing solid-state image sensing apparatus according to the third embodiment of the present invention. The embodiment of FIG. 7 is identical to the second embodiment of FIG. 4 except for provision of a timing control circuit 60 in place of timing control circuit 40 of FIG. 4.

The third embodiment shown in FIG. 7 will now be described in detail. Referring to FIG. 7, timing control circuit 60 comprises a data holding circuit 61 for holding step data $S_x$ designating the timing to discharge the charges in the opposite direction, a dividing circuit 62 for calculating 1/n of step data to be read from data holding circuit 61, an operation circuit 63 for calculating the sum of or the difference between step data $S_x$ and division data $S_x/n$, a frequency-multiplying circuit 64 for frequency-multiplying a horizontal synchronizing signal HD with a variable frequency-multiplying ratio, a step counter 65 serving as a down-counter which is counted down by a horizontal synchronizing signal $2^m HD$ which is frequency-multiplied by frequency-multiplying circuit 64, a comparison circuit 66 for making a comparison between data outputted from operation circuit 63 and a count output of counter 65 and, when the data and the count output match each other, generating discharge pulse BT to supply the same to discharge clock pulse generating circuit 22, a decoder 67 for detecting that an output of operation circuit 63 becomes a predetermined value, to output a data shifting signal DS and a frequency multiplying signal TW, and a read timing circuit 68 responsive to a vertical synchronizing signal VD for generating a read timing signal FT to supply the same to read clock pulse generating circuit 21 and to transfer clock pulse generating circuit 23.

Data holding circuit 61, dividing circuit 62, operation circuit 63, counter 65, comparison circuit 66 and read timing circuit 68 out of the elements of timing control circuit 60 each have basically the same function as data holding circuit 41, dividing circuit 42, operation circuit 43, counter 45, comparison circuit 46 and read timing circuit 47 shown in FIG. 4. However, data holding circuit 61, operation circuit 63, counter 65 and comparison circuit 66 are each constituted by bits, the number of which is higher by an appropriate number of bits than the number of bits of step data $S_x$ and count data $T_x$ of counter 65. Those circuits are each configured such that the appropriate number of the excessive bits may operate in response to data shifting signal DS to be outputted from decoder 67 in response to an output of operation circuit 63. In more detail, when data $S_{x+1}$ outputted from operation circuit 63 becomes lower than or equal to a predetermined value, "0" of several bits are added to lower order side of each of data $S_{x+1}$ and $T_x$ in each circuit. Accordingly, data $S_{x+1}$ and $T_x$ are replaced by values obtained as a result of the addition.

Operation of the third embodiment shown in FIG. 7 will now be described. First, when the timing to transfer the charges is included in the vertical video period, i.e., the exposure period is relatively long (the period denoted with L of FIG. 5), data $S_{x+1}$ is higher than or equal to a predetermined value. In response to this, decoder 67 applies frequency multiplying signal TW to frequency-multiplying circuit 64 and data shifting signal DS to each of circuits 61, 63, 65 and 66. Frequency-multiplying circuit 64 applies horizontal synchronizing signal HD as it is to counter 65 in response to frequency multiplying signal TW. Lower order bits are not added to each of data $S_{x+1}$ and $T_x$ in each of circuits 61, 63, 65 and 66. Thus, in this case, the timing to discharge the charges is set in a unit of a 1H period.

Meanwhile, when the charge discharging timing is included in the vertical blanking period, i.e., the exposure period is considerably short (the period denoted with L' of FIG. 5), data $S_{x+1}$ is lower than or equal to a predetermined value. In response to this, decoder 67 applies frequency multiplying signal TW to frequency-multiplying circuit 64 and data shifting signal DS to each of circuits 61, 63, 65 and 66. Lower order bits are added to each of data $S_{x+1}$ and $T_x$ in each of circuits 61, 63, 65 and 66. Frequency-multiplying circuit 64 sets its frequency multiplying ratio in accordance with the number of the added bits.

A detailed description will now be given on the operation of the third embodiment shown in FIG. 7 by employing numeric values. In the following example, n of dividing circuit 62 is set to 8, and each data is constituted by 8 bits.

First, when step data $S_x$ for defining the timing to discharge the charges is "10110010", the exposure period is set to 178H. Dividing circuit 62 then shifts the foregoing data $S_x =$ "10110010" by 3 bits to lower order, so as to obtain $S_x/8 =$ "00010110". This $S_x/8$ corresponds to the period of 22H.

When expansion signal OPEN is applied to operation circuit 63 from comparison determining circuit 3, since $S_{x+1} = S_x + S_x/8$ in this case, data $S_{x+1}$ is "10110010" + "00010110" = "11001000" likewise the embodiment of FIG. 4. Thus the exposure period is expanded by 22H to 200H.

On the other hand, when shortening signal CLOSE is applied to operation circuit 63 from comparison determining circuit 3, since $S_{x+1} = S_x - S_x/8$ in this case, data $S_x$ is "10110010" − "00010110" = "10011100" likewise the embodiment of FIG. 4. Thus, the exposure period is shortened by 22H to 156H.

Thus, when data $S_{x+1}$ is larger than "00000111 (=7H)", the charge discharging timing is within the vertical video period, so that the exposure period L is set in a 1H unit in each step as described above.

However, when decoder 67 detects that data $S_{x+1}$ is "00000111 (=7H)", and the charge discharging timing enters in the vertical blanking period, decoder 67 generates data shifting signal DS and adds, e.g., "0" of 2 bits to lower order side of the data $S_{x+1}$, to obtain data $S'_{x+1} =$ "0000011100" designating a 7H exposure period. As a result, the 7H exposure period is divided into 28 intervals in a (¼) H unit. At the same time, decoder 67 generates frequency multiplying signal TW and sets the frequency multiplying ratio of frequency-multiplying circuit 64 to 4. That is, when the period of clock pulses for counting down counter 60 is ¼, the setting of the exposure period is carried out in the (¼) H unit.

Accordingly, dividing circuit 62 shifts $S'_{x+1} =$ "0000011100" by 3 bits to lower order and calculates $S'_{x+1}/8 =$ "0000000011" to supply the same to operation circuit 63. When supplied with expansion signal OPEN from comparison determining circuit 3, operation circuit 63 calculates $S'_{x+1} + S'_{x+1}/8$ and outputs data $S'_{x+2}$ that is "0000011111 (=31)". That is, the exposure period at this time is set to (31/4) H. Further, when supplied with shortening signal CLOSE from comparison determining circuit 3, operation circuit 63 calculates $S'_{x+1} - S'_{x+1}/8$ and outputs data $S'_{x+2}$ that is "0000011001". That is, the exposure period at this time is set to (25/4) H.

Conversely, when detecting that data $S'_{x+1}$ is "0000100000 (=32)" and that the charge discharging timing transfers from the vertical blanking period into the vertical video period, decoder 67 generates data shifting signal DS to remove lower order 2 bits of this data $S'_{x+1}$ and also generates frequency multiplying signal TW to set the frequency multiplying ratio of frequency-multiplying circuit 64 to 1. As a result, timing control circuit 60 returns to an initial operating state, and the exposure period is set in a 1H unit in each step.

The addition of bits to the lower order side of data $S_{x+1}$ as described above results in an increase in the number of bits in each circuit and a complication in the configuration of each circuit. Thus, such configuration may be provided that new data $S'_{x+1}$ is obtained by, e.g. shifting data $S_{x+1}$ by 2 digits to higher order side. In this case, since several bits in the higher order of data $S_{x+1}$ are usually "0", data $S_{x+1}$ may be shifted to higher order side in the range of the number of the bits of "0".

Meanwhile, frequency-multiplying circuit 64 for obtaining clock pulses counting down counter 65 can be replaced by a frequency demultiplier for frequency-demultiplying clock pulses having a sufficiently shorter period than that of a horizontal synchronizing signal HD. More specifically, the clock pulses may be frequency-demultiplied in a predetermined frequency demultiplying ratio, to supply clock pulses having a period $\frac{1}{2}^m$ times (m is an integer) the period of horizontal synchronizing signal HD.

Figure 8:
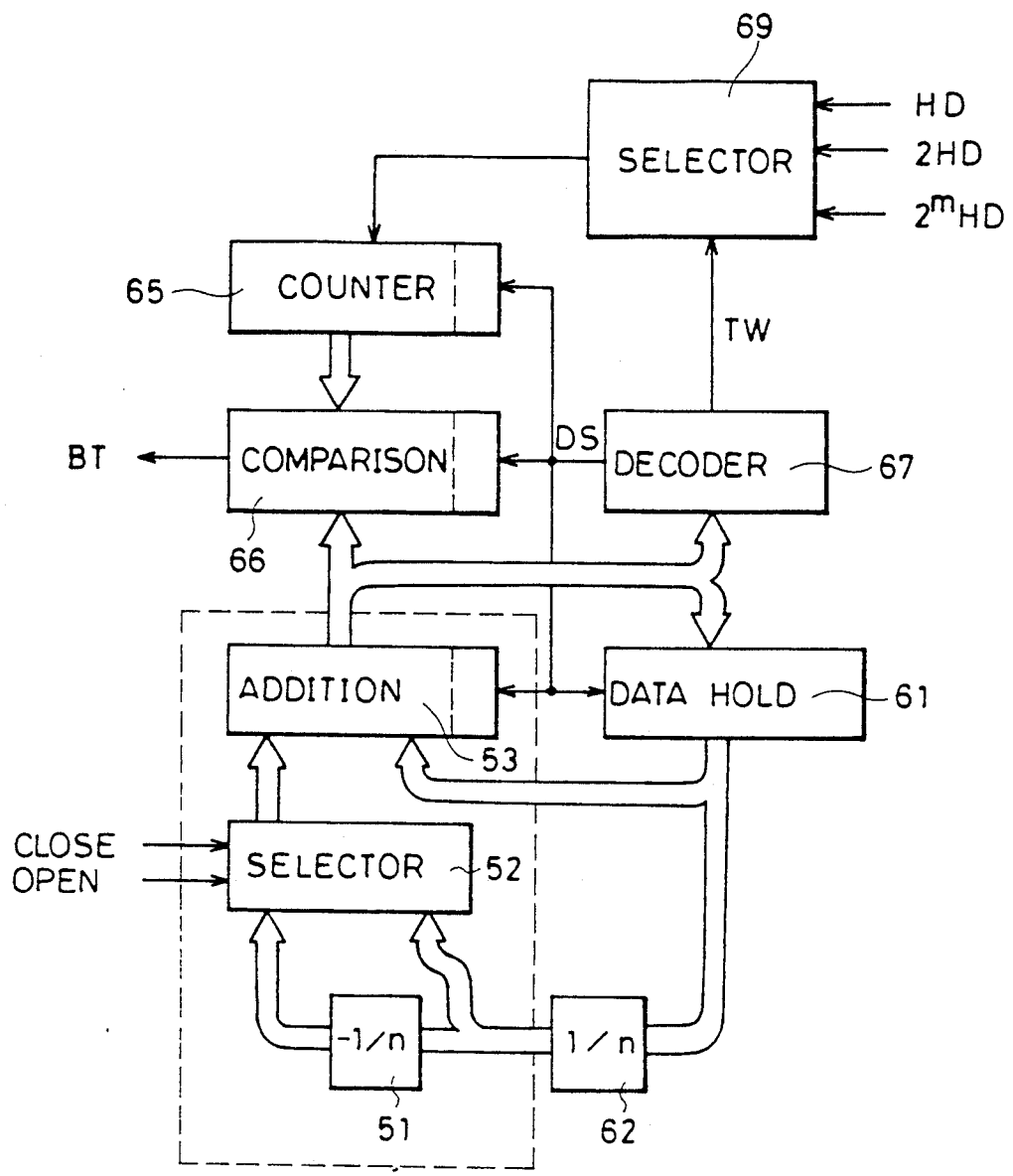
FIG. 8 is a block diagram showing another embodiment of a timing control circuit of FIG. 7.

FIG. 8 is a block diagram showing another embodiment of timing control circuit 60 of FIG. 7. In timing control circuit 60 of FIG. 8, a selector 69 selects one of a horizontal synchronizing signal to be supplied from a signal source not shown and signals 2HD, 4HD, . . . , $2^m$HD having periods $2^m$ times that of horizontal synchronizing signal HD in response to frequency multiplying signal TW from decoder 67, and applies the selected signal as clock pulses to counter 65. A detailed description as to operation circuit 63 will not be repeated here since the description thereof has already been given with reference to FIG. 6.

As described heretofore, according to the third embodiment of the present invention, even when the exposure period becomes significantly short, decreasing the varying width of the exposure period in each step to smaller than 1H makes it possible to uniform the varying ratio of the exposure period and to prevent unnatural changes in luminance on a reproduced picture.

The foregoing first through third embodiments show such a case that the discharge of the signal charges from light receiving portion 11 of frame transfer type CCD 10 is achieved by the transfer of the signal charges in the opposite direction from the reading direction. The present invention is, however, also applicable to a CCD of such a type that signal charges are discharged to an overflow drain provided in a light receiving portion and to a CCD having a so-called longitudinal overflow drain structure that signal charges are discharged from a light receiving portion to a substrate portion. In addition, the present invention is also applicable to an interline transfer type CCD wherein signal charges are discharged to an overflow drain provided in a light receiving portion or signal charges are discharged from a light receiving portion to a substrate portion.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A solid-state image sensing apparatus for generating an image signal in accordance with an image pattern of an object, comprising:

a solid-state image sensing device formed of a plurality of light receiving elements arranged two-dimensionally in the directions of rows and columns, for converting light incident from said object into signal charges;

means for driving said solid-state image sensing device to once discharge said signal charges produced and stored in said solid-state image sensing device externally from said solid-state image sensing device at variable timing in each vertical scanning period of said image signal, and thereafter to read the signal charges produced and stored in said solid-state image sensing device in the remaining period of said vertical scanning period at predetermined timing in a vertical blanking period of said vertical scanning period;

exposure determining means for determining whether or not an exposure state of said solid-state image sensing device is in the range of appropriate exposure in accordance with the amount of the signal charges read from said solid-state image sensing device; and timing control means for controlling said driving means so as to set timing to discharge said signal charges in response to a result of determination by said exposure determining means, said timing control means including data holding means for holding data $S_x$ designating the timing to discharge said signal charges for each vertical scanning period, operation means for calculating data $S_x + S_x/n$ (n is an integer) or $S_x - S_x/n$ based on said data $S_x$ in response to the result of determination by said exposure determining means, counting means for performing a counting operation in response to clock pulses based on a horizontal synchronizing signal of said image signal, to generate count data $T_x$ varying with an elapse of time, and comparison means for making a comparison between the data $S_x \pm S_x/n$ to be supplied from said operation means and the count data $T_x$ to be supplied from said counting means, to set signal charge discharging timing to timing at which both the data $S_x \pm S_x/n$ and the count data $T_X$ match each other.

2. The solid-state image sensing apparatus according to claim 1, wherein said operation means performs a calculation of said data $S_x$ and $S_x/n$ in the direction of delaying said signal charge discharging timing when said exposure determining means determines the excessively large amount of exposure, while said operation means performs a calculation of said data $S_x$ and $S_x/n$ in the direction of advancing said signal charge discharging timing when said exposure determining means determines the excessively small amount of exposure.

3. A solid-state image sensing apparatus for generating an image signal in accordance with an image pattern of an object, comprising:
   a solid-state image sensing device formed of a plurality of light receiving elements arranged two-dimensionally in the directions of rows and columns, for converting light incident from said object into signal charges;
   means for driving said solid-state image sensing device to once discharge said signal charges produced and stored in said solid-state image sensing device externally from said solid-state image sensing device at variable timing in each vertical scanning period of said image signal, and thereafter to read the signal charges produced and stored in said solid-state image sensing device in the remaining period of said vertical scanning period at predetermined timing in a vertical blanking period of said vertical scanning period;
   exposure determining means for determining whether or not an exposure state of said solid-state image sensing device is in the range of appropriate exposure in accordance with the amount of the signal charges read from said solid-state image sensing device; and
   timing control means for controlling said driving means so as to set timing to discharge said signal charges in response to a result of determination by said exposure determining means,
   said timing control means including
      data holding means for holding data $S_x$ designating the timing to discharge said signal charges for each vertical scanning period,
      operation means for calculating data $S_x + S_x/n$ (n is an integer) or $S_x - S_x/n$ based on said data $S_x$ in response to the result of determination by said exposure determining means,
      counting means for performing a counting operation in response to clock pulses based on a horizontal synchronizing signal of said image signal, to generate count data $T_x$ varying with an elapse of time,
      comparison means for making a comparison between the data $S_x \pm S_x/n$ to be supplied from said operation means and the count data $T_x$ to be supplied from said counting means, to set signal charge discharging timing to timing at which both the data $S_x \pm S_x/n$ and the count data $T_x$ match each other, and
      means for controlling said timing control means to set said signal charge discharging timing in a unit of a period shorter than one horizontal scanning period of said image signal when said charge discharging timing is in said vertical blanking period.

4. The solid-state image sensing apparatus according to claim 3, wherein
   said means for controlling said timing control means includes
   means for generating clock pulses having a shorter period than said horizontal scanning period to supply the generated clock pulses to said counting means during said vertical blanking period.

5. The solid-state image sensing apparatus according to claim 4, wherein
   said counting means performs a counting operation in a shorter period that said horizontal scanning period during said vertical blanking period, and performs a counting operation in the same period as said horizontal scanning period during the other periods than said vertical blanking period.

6. The solid-state image sensing apparatus according to claim 3, wherein
   said means for controlling said timing control means includes
   means for detecting that said signal charge discharging timing enters in said vertical blanking period in accordance with the data $S_x \pm S_x/n$ to be supplied from said operation means, and
   means responsive to a detection output of said detecting means for shifting data in each of said data holding means, said operation means, said counting means and said comparison means to higher order by m digits (m is an integer) and also multiplying the period of clock pulses to be applied to said counting means by $\frac{1}{2}^m$.

7. The solid-state image sensing apparatus according to claim 3, wherein
   said means for controlling said timing control means includes
   means for detecting that said signal charge discharging timing enters in said vertical blanking period in accordance with the data $S_x \pm S_x/n$ to be supplied from said operation means, and
   means responsive to the detection output of said detecting means for shifting data in each of said data holding means, said operation means, said counting means and said comparison means to lower order by m digits (m is an integer) and also multiplying the period of clock pulses to be applied to said counting means by $2^m$.

8. The solid-state image sensing apparatus according to claim 3, wherein
   said operation means performs a calculation of said data $S_x$ and $S_x/n$ in the direction of delaying said signal charge discharging timing when said exposure determining means determines the excessively large amount of exposure, while said operation means performs a calculation of said data $S_x$ and $S_x/n$ in the direction of advancing said signal charge discharging timing when said exposure determining means determines the excessively small amount of exposure.

* * * * *